United States Patent [19]
Fledderjohn et al.

[11] Patent Number: 5,211,541
[45] Date of Patent: May 18, 1993

[54] TURBINE SUPPORT ASSEMBLY INCLUDING TURBINE HEAT SHIELD AND BOLT RETAINER ASSEMBLY

[75] Inventors: Steve R. Fledderjohn, Cincinnati; James C. Przytulski, Fairfield; Sidney B. Elston, III, Cincinnati; Alan R. Gilchrist, Fairfield; Ambrose A. Hauser, Wyoming, all of Ohio

[73] Assignee: General Electric Company, Cincinnati, Ohio

[21] Appl. No.: 841,154

[22] Filed: Feb. 25, 1992

Related U.S. Application Data

[63] Continuation-in-part of Ser. No. 812,476, Dec. 23, 1991.

[51] Int. Cl.$^5$ .............................................. F01D 5/06
[52] U.S. Cl. .............................. 416/198 A; 415/216.1
[58] Field of Search .................... 416/198 A; 415/115, 415/216.1, 199.5

[56] References Cited

U.S. PATENT DOCUMENTS

| | | | |
|---|---|---|---|
| 2,747,367 | 5/1956 | Savin, Jr. | 60/39.16 |
| 3,051,437 | 8/1962 | Morley et al. | 253/39 |
| 3,163,353 | 12/1964 | Petrie | 230/116 |
| 3,245,734 | 4/1966 | Morley | 416/198 A |
| 3,382,670 | 5/1968 | Venable | 60/39.08 |
| 3,727,998 | 4/1973 | Haworth et al. | 416/198 A |
| 3,823,553 | 7/1974 | Smith | 60/39.16 |
| 3,830,056 | 8/1974 | Willis, Jr. et al. | 60/39.16 |
| 3,842,595 | 10/1974 | Smith et al. | 60/39.36 |
| 4,064,691 | 12/1977 | Nash | 60/39.06 |
| 4,310,286 | 1/1982 | Peters et al. | 416/198 A |
| 4,361,213 | 11/1982 | Landis, Jr. et al. | 416/198 A |
| 4,397,471 | 8/1983 | Feldman et al. | 277/27 |
| 4,502,276 | 3/1985 | Pask | 60/39.32 |
| 4,648,241 | 3/1987 | Putman et al. | 415/115 |
| 4,747,750 | 5/1988 | Chlus et al. | 416/198 A |
| 4,843,825 | 7/1989 | Clark | 60/756 |
| 4,887,949 | 12/1989 | Dimmick, III | 411/121 |
| 4,987,736 | 1/1991 | Clokajlo | 60/39.36 |

FOREIGN PATENT DOCUMENTS 0109874 10/1983 European Pat. Off. ......... 416/198 A

OTHER PUBLICATIONS

General Electric Company, 4-page drawing of CF6-80C2 gas turbine engine in public use more than one year.

Primary Examiner—Edward K. Look
Assistant Examiner—Michael S. Lee
Attorney, Agent, or Firm—Jerome C. Squillaro

[57] ABSTRACT

A turbine support assembly includes a turbine rotor joined to a fan shaft through a support shaft. The support shaft is joined to the fan shaft in a V-configuration having first and second legs joined together at an apex and inclined axially apart, with at least the first leg forming an integral part of the fan shaft. The second leg is rotatably supportable to a frame. The V-configuration increases the stiffness of the turbine support to reduce blade tip clearances. The present invention also provides an annular integral bolt heat shield and axial retention apparatus to axially retain bolts used for holding together two rotor elements during assembly when the bolts are otherwise subject to sliding into a closed cavity of the assembled engine or one of its modules. The integral retainer and heat shield engage the bolts disposed through bolt holes in a gas turbine engine rotor shaft so that the bolts remain straight during assembly when a second rotor element such as a second shaft is being attached to the first shaft, and bolt holes in the second shaft have to engage and fit over the bolts of the first shaft. One particular embodiment of the present invention provides a low pressure turbine rotor shaft assembly of a low pressure turbine module wherein forward and aft shafts are attached by bolts which have bolt heads in a closed cavity of the module and are slidably disposed through corresponding bolt holes of each shaft such that the bolt heads are disposed aft of the aft shaft. An integral heat shield and axial bolt retainer is mounted to the aft shaft aft of the bolt heads so as to trap and retain the bolt heads between the shield and the aft shaft.

5 Claims, 6 Drawing Sheets

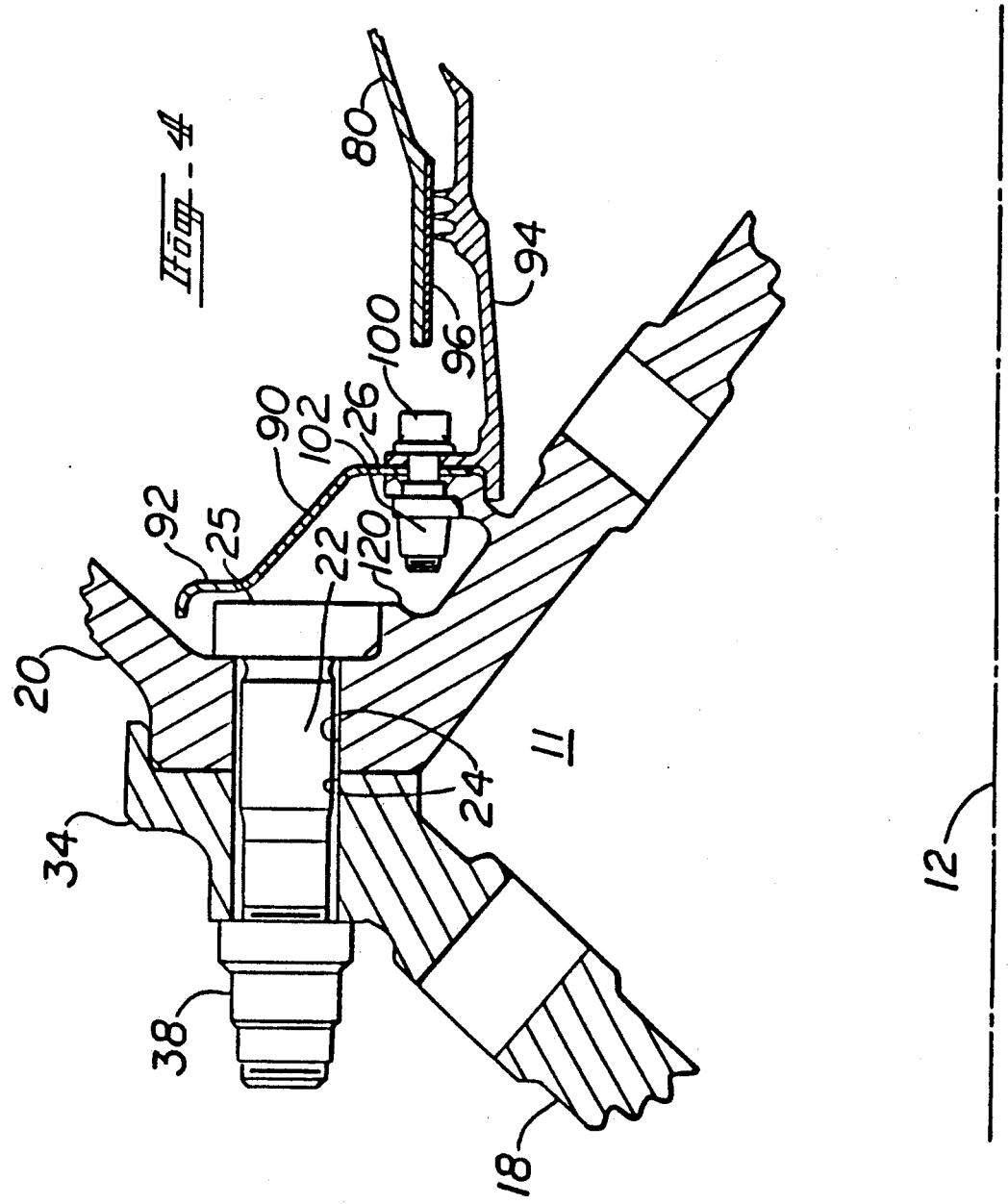

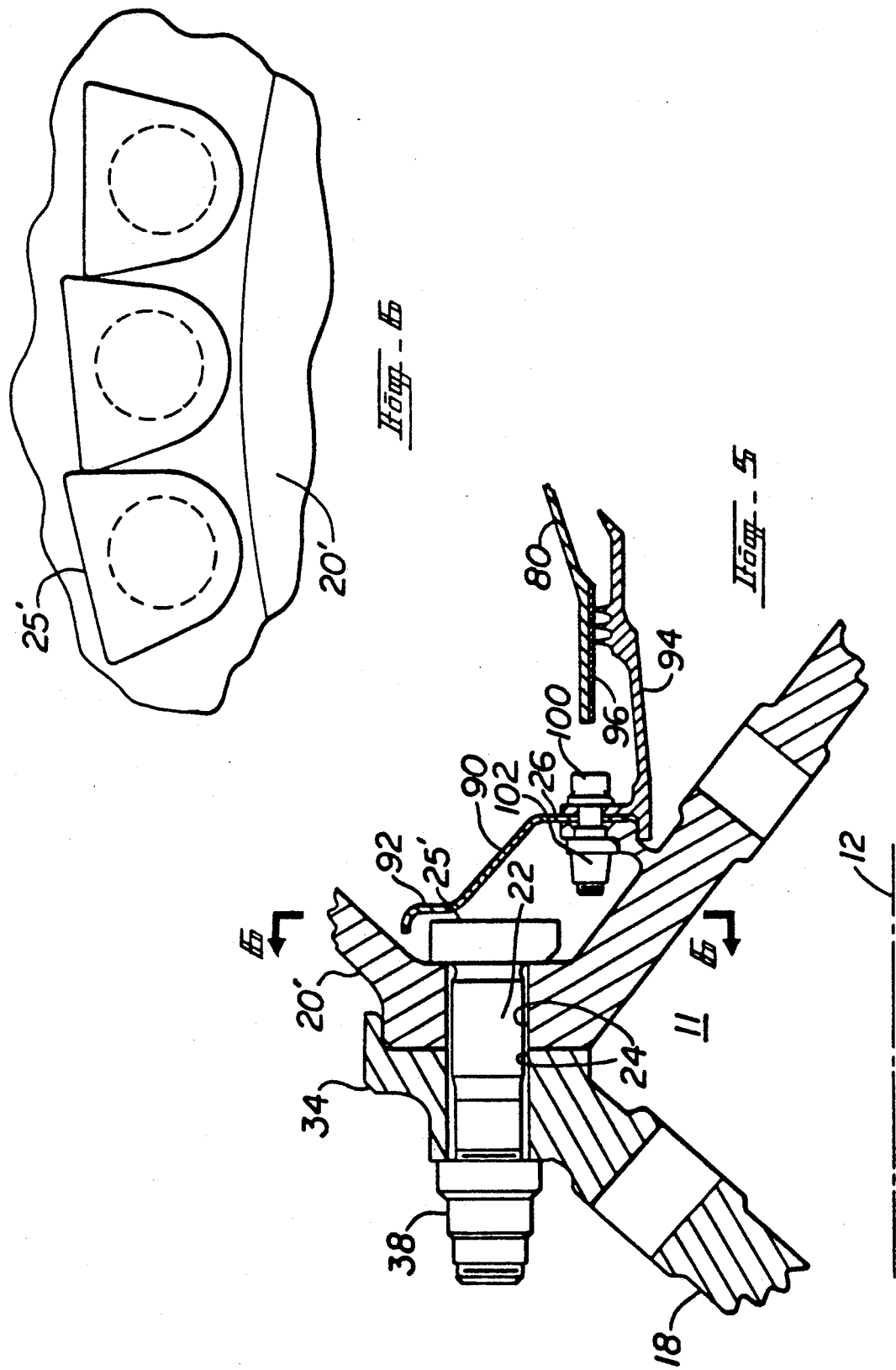

TURBINE SUPPORT ASSEMBLY INCLUDING TURBINE HEAT SHIELD AND BOLT RETAINER ASSEMBLY

This is a continuation-in-part of application Ser. No. 07/812,476 filed Dec. 23, 1991, copending.

BACKGROUND OF THE INVENTION

1. Field of the Invention

The present invention relates generally to gas turbine engines, and, more specifically, to a turbine support assembly therein, and to gas turbine engine rotor attachment and particularly to heat shields and axial retention for bolts used to connect turbine shafts.

2. Description of Related Art

In an exemplary conventional turbofan gas turbine engine, a compressor is driven by a high pressure turbine through a drive shaft extending therebetween. And, a fan is driven by a low pressure turbine through a fan shaft extending therebetween which is disposed coaxially with the high pressure turbine drive shaft. The fan shaft is typically supported to a stationary casing by frames such as a fan frame and turbine rear frame having roller bearings which support radial loads transmitted by the fan shaft. The low pressure turbine must be suitably supported for preventing unacceptably large clearances between the blade tips thereof and the casing surrounding the blade tips for reducing performance losses due to leakage of combustion gases over the blade tips. Both axial and radial applied forces acting on the low pressure turbine must be suitably accommodated to prevent undesirable variations in blade tip clearances.

More specifically, the low pressure turbine may conventionally include an individual disk from which the rotor blades extend, with the disk being removably fixedly joined to the fan shaft by bolts for example. In another embodiment, the low pressure turbine can include several stages with respective disks and blades extending therefrom, with the disks being suitably joined together by being bolted or welded. The several stages may be collectively joined to the fan shaft by either two axially spaced apart support shafts, or a single support shaft typically disposed near the middle of the low pressure turbine. The two support shaft embodiment distributes the turbine loads to the fan shaft through two axially spaced apart planes and, therefore, more effectively supports the low pressure turbine for reducing variations in the blade tip clearances. However, the single support shaft embodiment is inherently more flexible than the two support shaft embodiment which allows the applied forces to develop bending moments around the single support shaft which elastically deflect the low pressure turbine and, therefore, vary the blade tip clearances of the several stages. Due to the flexibility of the single support shaft, the blade tip clearances of the several stages can vary axially from stage to stage as well as circumferentially around each stage.

Furthermore, in one arrangement, the single support shaft can be removably bolted to the fan shaft, with the fan shaft being supported by bearings at two planes or more. During manufacture of the engine, the low pressure turbine module which is initially separated from the fan shaft is typically balanced as a module before assembly to the fan shaft. Since the support shaft is bolted to the fan shaft upon assembly, and does not otherwise have a separate bearing support, a balancing arbor must be used to simulate the aft end of the fan shaft and its bearings to support the low pressure turbine in the balancing machine. Once balanced, the low pressure turbine may be bolted to the fan shaft and its bearings and supported thereby.

Similarly, in this exemplary embodiment, during maintenance of the engine requiring the removal of the low pressure turbine, another arbor is required to support the low pressure turbine if the fan shaft is removed therefrom.

Gas turbine engines conventionally transfer rotational mechanical energy from turbine sections of the engine to the fan and compressor sections via shaft assemblies that are bolted together for easy assembly and disassembly. Ease of assembly and disassembly provides many benefits from a cost standpoint and enhance modular designs which have been developed to help ship and install gas turbine engines. Examples of such modular engines are disclosed in U.S. Pat. No. 3,842,595 entitled "Modular Gas Turbine Engine" by Smith et al and in U.S. Pat. No. 3,823,553 entitled "Gas Turbine With Selfcontained Power Turbine Module" by Smith, both assigned to the same assignee as the present invention.

Due to the large size of modern high bypass ratio fanjet engines, and particularly their fan sections, it has become useful to incorporate modularity into engine designs. Modularity enhances the engine's assembly and disassembly and facilitates shipment of the engine and its parts for original installation, overhaul, repairs, and retrofitting.

Bolt assemblies to secure shaft sections for the low pressure turbine are often not accessible from the rear during assembly. Axial bolt retention means are required during assembly because such bolt heads lie in closed cavities. Heat shielding the bolts from the hot gases passing through rear stages of the low pressure turbine is also highly desirable if not often required to prolong the useful life of the assembly and increase engine reliability.

Prior engine designs such as the one illustrated in FIG. 1 have incorporated split ring retainers 2 disposed in circumferential grooves 4 formed in the shank 6 of and to retain the bolt 8 which is used to attach a forward rotor element 10 to an aft rotor element 12. Another prior art design is illustrated in FIG. 2, and uses an individual bolt hook 14 to retain the bolt 8 which attaches forward rotor element 5 to aft rotor element 7. Yet another apparatus shown in the prior art is a retention clip disclosed in U.S. Pat. No. 4,887,949 entitled "Bolt Retention Apparatus" by Dimmick, III et al. All of these designs add weight, increase the number of engine parts, and increase the complexity of the engine and assembly and disassembly procedures. Circumferential grooves reduce the shanks load carrying capability and split rings and clips are subject to and may also introduce undesirable engine vibrations.

OBJECTS OF THE INVENTION

Accordingly, one object of the present invention is to provide a new and improved turbine support assembly.

Another object of the present invention is to provide a turbine support assembly having a single support shaft joined to the fan shaft in a configuration having increased stiffness for reducing blade tip clearance during operation.

Another object of the present invention is to provide a turbine support assembly which may be separated from the fan shaft without the need for a supporting arbor.

Another object of the present invention is to provide a turbine support assembly having integral components for reducing the total number of parts, weight, and cost.

Another object of the present invention is to provide an improved turbine heat shield and bolt retainer assembly.

SUMMARY OF THE INVENTION

A turbine support assembly includes a turbine rotor joined to a fan shaft through a support shaft. The support shaft is joined to the fan shaft in a V-configuration having first and second legs joined together at an apex and inclined axially apart, with at least the first leg forming an integral part of the fan shaft. The second leg is rotatably supportable to a frame.

The present invention also provides a bolt heat shield and axial retention apparatus to axially retain bolts used for holding together two engine elements during assembly when the bolts are otherwise subject to sliding into a closed cavity of the assembled engine or one of its modules.

The preferred embodiment of the invention provides a one piece annular heat shield for a bolted assembly attaching two rotor elements together wherein the bolts are thermally shielded by the heat shield and the heat shield is mounted to a first one of the rotor elements so as to trap and retain the bolt heads between the shield and first rotor element.

One particular embodiment of the present invention provides a low pressure turbine rotor shaft assembly of a low pressure turbine module wherein forward and aft shafts are attached by bolts which are slidably disposed through corresponding bolt holes of each shaft such that the bolt heads are disposed aft of the aft shaft. An annular heat shield is mounted to the aft shaft aft of the bolt heads so as to trap and retain the bolt heads between the shield and the aft shaft.

ADVANTAGES

The present invention provides an improved turbine support assembly having increased stiffness among other advantages.

The present invention also provides axial bolt retention without any additional parts beyond those of the heat shield apparatus with which it is integral. It provides ease of assembly, disassembly, and helps prevent misassembly of the bolted construction and low pressure turbine module. The present invention provides improved bolt retention while eliminating many small parts that are subject to vibration and vibrational stress in the engine.

BRIEF DESCRIPTION OF THE DRAWINGS

The foregoing aspects and other features of the invention are explained in the following description, taken in connection with the accompanying drawing where:

FIG. 4 is an exploded cross-sectional view of the shaft attachment apparatus in FIG. 3 showing in more detail the integral heat shield and bolt retention apparatus.

FIG. 5 is an exploded cross-sectional view of the shaft attachment apparatus in FIG. 3 showing an alternate embodiment of a bolt anti-rotation means.

FIG. 6 is an aft view of the bolt anti-rotation means shown in FIG. 5.

DETAILED DESCRIPTION OF THE INVENTION

Figure 1:
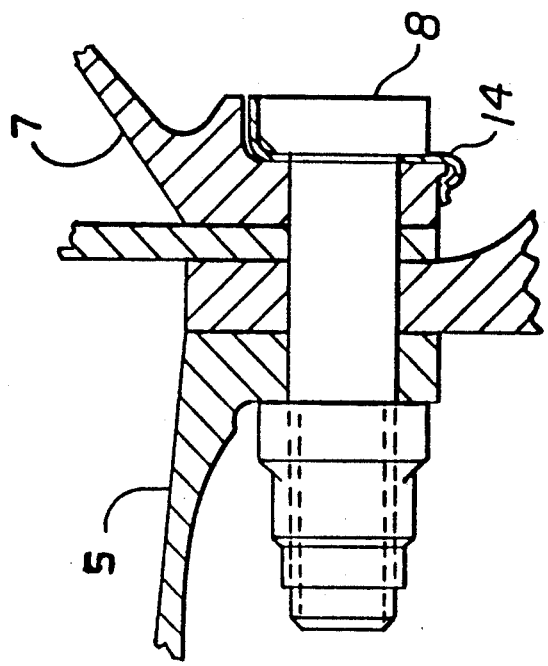
FIG. 1 is a cross-sectional view of a prior art split ring bolt retention means.
Figure 2:
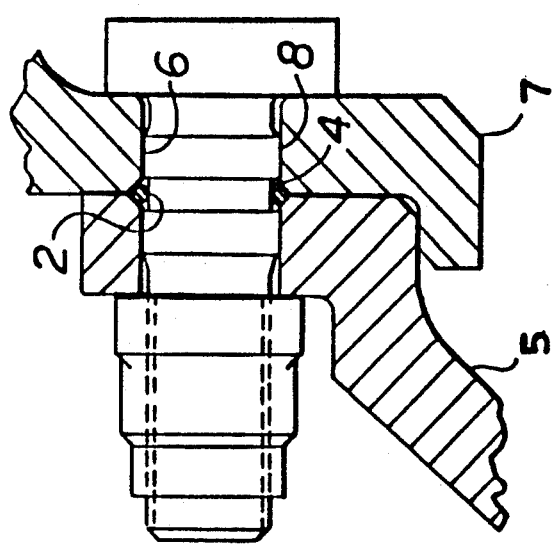
FIG. 2 is a cross-sectional view of a prior art hook bolt retention means.
Figure 3:
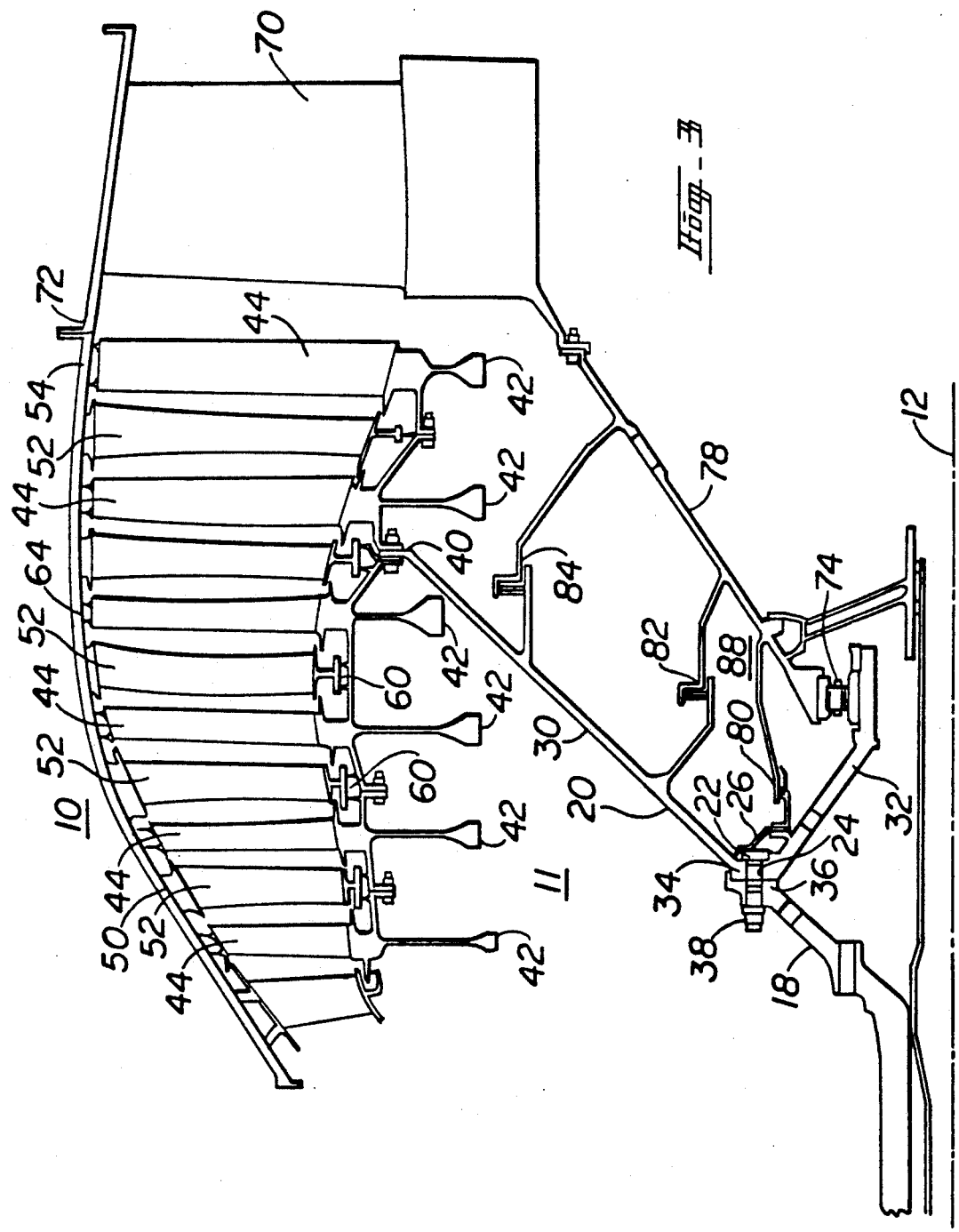
FIG. 3 is a cross-sectional view of a portion of a modular fan-jet engine including an integral heat shield and bolt retention means in accordance with the preferred embodiment of the present invention.

This invention is particular but not limited to a high bypass fan-jet gas turbine engine exemplified by the CFM, CF6, and GE90 series of engines by General Electric, the assignee of this patent application. Illustrated in FIG. 3, is a low pressure turbine (LPT) section 10 of a fan-jet gas turbine engine (not shown in its entirety) having a low pressure rotor (LPR) assembly generally shown at 11 circumferentially disposed about engine centerline 12. LPR assembly 11 includes two LPR shafts, a forward shaft 18 and an aft shaft 20 attached to each other by bolts 22 which are retained in place disposed in aft shaft bolt holes 24 during assembly by an integral heat shield and axial bolt retainer 26 mounted to aft shaft 20 in accordance with the preferred embodiment of the present invention.

Aft shaft 20 has a generally aft opening conical web 30 attached to a generally aft closing conical hub 32 at a flange like rim 34. Forward shaft 18 includes an aft flange 36 which is bolted to rim 34 by bolts 22 and corresponding nuts 38. Web 30 at its radial outer periphery 40 is bolted to it a series of LPT disks 42 which support radially outwardly extending LPT blades 44. Inter-dispersed between LPT blades 44 are stator assemblies 50 including LPT stator vanes 52 depending radially inward from an LPT casing 54. LPT stator vanes 52 are in rotational sealing engagement with LPT rotor 11 at stator seal 60 and LPT blades 44 are in rotational sealing engagement with casing 54 at rotor blade seal 64.

A LPT frame 70 attached to casing 54 at its radially outward end 72 rotationally supports LPT shaft 20 by way of an LPT bearing assembly 74. LPT frame 70 includes a conical web like strut 78 and which is in rotational sealing engagement with web 30 of aft shaft 20 using inner, intermediate, and outer seal assemblies 80, 82, and 84 respectively. For modular construction, as well as other types, LPR assembly 11 is set into LPT frame 70 with aft shaft 20 not attached to forward shaft 18. Bolts 22 are, however set in their respective bolt holes 24 held in place by integral heat shield and retainer 26 so that they will not fall into cavity 88 during assembly and disassembly of forward shaft 18 to aft shaft 20.

Referring to FIG. 4, forward shaft 18 is attached to aft shaft 20 by bolts 22 which are retained in place and disposed in aft shaft bolt holes 24 during assembly by a one piece annular integral heat shield and axial bolt retainer 26 mounted to aft shaft 20 by a second set of bolts 100 and nuts 102. In accordance with the preferred embodiment of the present invention second set of bolts 100 and nuts 102 also attaches a rotatable inner knife edge seal 94, which seals against a seal land 96 of inner seal assembly 80, to rotor assembly 11. Alternatively integral heat shield and axial bolt retainer 26 may also be a one piece integral element together with inner knife edge seal 94.

Integral heat shield and axial bolt retainer 26 includes a conically shaped shield portion 90 having an outer inverted L shaped retainer portion 92. Shield portion 90 is spaced sufficiently apart from bolts 22 so as to provide thermal protection for the bolts.

Retainer portion 92 is spaced apart from bolts 22 so as to provide axial retention of the bolts in holes 24 of aft shaft 22 and may be used to keep the bolts horizontal so that during assembly forward shaft 18 and its bolt holes 24 can be easily aligned and mated to the aft shaft. One particular embodiment of the present invention provides an anti-rotation rim 120 formed on aft shaft 20 so as to engage a bolt head 25 of bolt 22 along a flat of the head which prevents bolts 22 from turning when nuts 38 are torqued and also helps keep bolts 22 horizontal, essentially parallel to centerline 12.

Another embodiment shown in FIGS. 5 and 6 does not use an anti-rotation rim on aft shaft 20, but rather provides anti-rotation bolt heads 25'. As shown in FIG. 6 adjacent anti-rotation bolt heads 25' are shaped and circumferentially spaced apart such that they interfere with each other to prevent bolts 22 from rotating when nuts 38 are being torqued.

Figure 7:
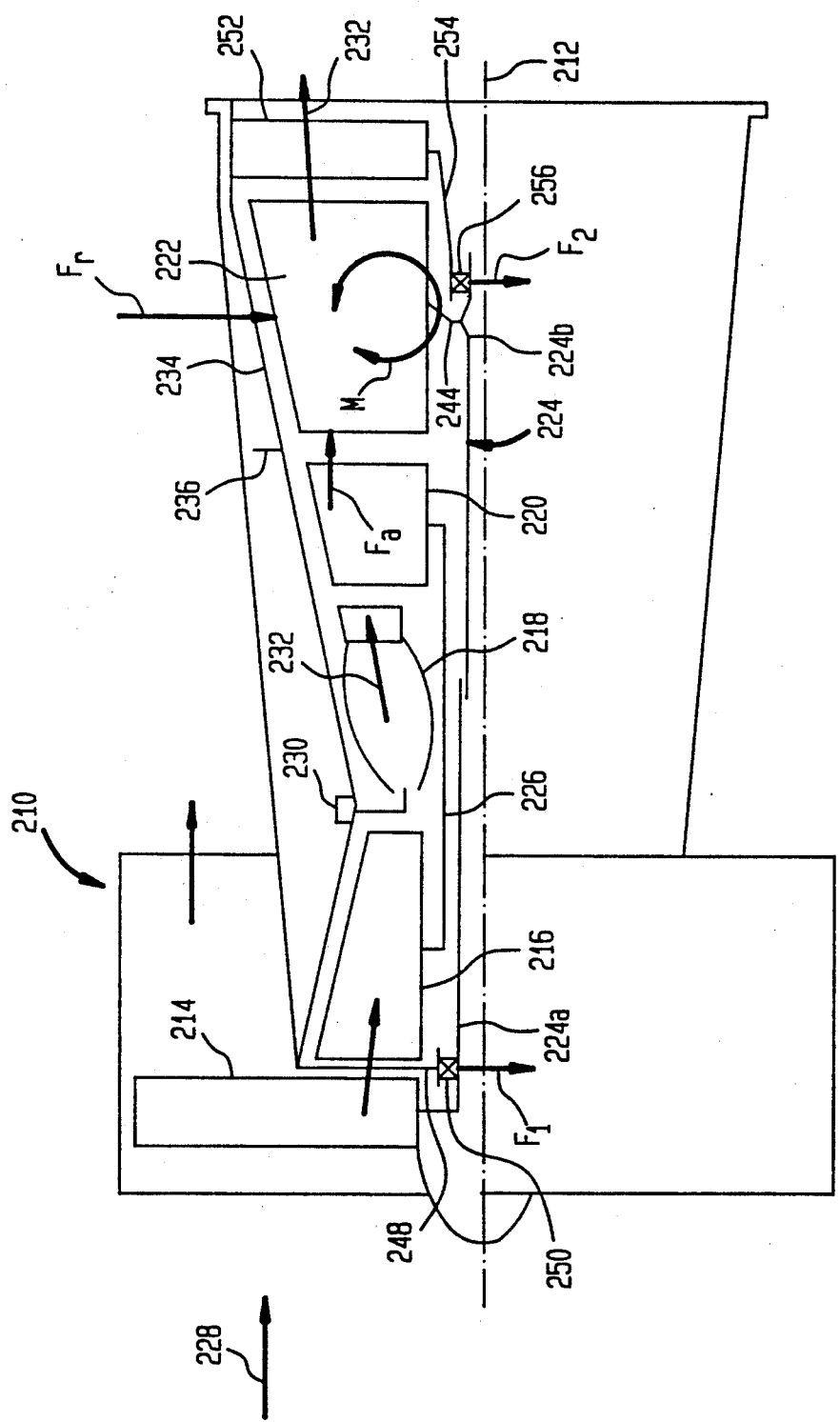
FIG. 7 is a schematic, longitudinal sectional view of a turbofan engine including a turbine support assembly in accordance with one embodiment of the present invention.

Illustrated in FIG. 7 is an exemplary turbofan gas turbine engine 210 having a longitudinal axial centerline axis 212. The engine 210 includes in serial flow communication a conventional fan 214, a conventional compressor 216, a conventional annular combustor 218, a conventional high pressure turbine (HPT) 220, and a low pressure turbine (LPT) 222 supported in accordance with one embodiment of the present invention. The LPT 222 is removably fixedly joined to the fan 214 by a fan shaft 224 as disclosed in further detail hereinbelow. The HPT 220 is conventionally joined to the compressor 216 through a drive shaft 226.

The LPT 222 is an alternate embodiment of the LPT 10 described above joined to the fan shaft 224, which is an alternate embodiment of the forward shaft 18. Both FIGS. 7 and 8 disclose various alternate embodiments of components described above which have different numeral designations for distinguishing structural and functional cooperation of this turbine support embodiment.

During operation of the engine 210, ambient air 228 is channeled through the rotating fan 214, an outer portion of which provides thrust and an inner portion of which is channeled into the compressor 216 wherein it is compressed and discharged into the combustor 218. A conventional fuel supply means 230 introduces fuel to the compressed air in the combustor 218, which is conventionally ignited for generating combustion gases 232. The combustion gases 232 are channeled downstream through the HPT 220 which extracts energy therefrom for powering the compressor 216, and the LPT 222 also extracts energy from the combustion gases 232 for powering the fan 214.

Figure 8:
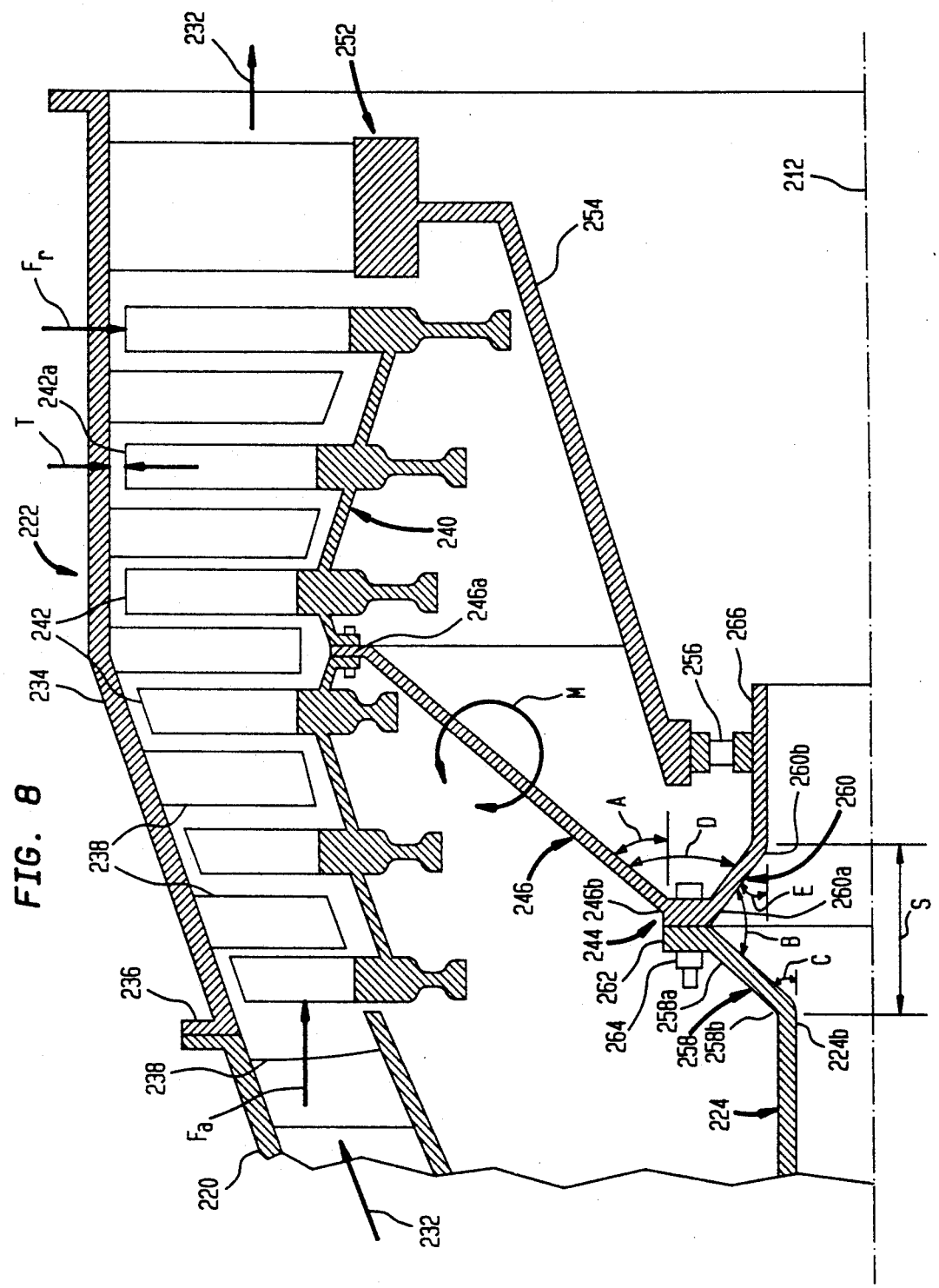
FIG. 8 is an enlarged longitudinal sectional view of a portion of the low pressure turbine illustrated in FIG. 7.

An assembly for supporting the LPT 222 in accordance with one embodiment of the present invention is illustrated in more particularity in FIG. 8. The LPT 222 includes an annular casing 234 which is conventionally removably fixedly joined to the casing surrounding the HPT 220 at a radial flange 236. The casing 234 includes a plurality of stages or rows of conventional stator vanes 238 extending radially inwardly therefrom, with six exemplary stages being illustrated. The LPT 222 further includes an annular turbine rotor 240 having a plurality of stages or rows of rotor blades 242 extending radially outwardly therefrom, with six exemplary stages being illustrated. The vane and rotor stages alternate so that each stage of stator vanes 238 is disposed upstream of a respective stage of rotor blades 242 in flow communication therewith for channeling the combustion gases 232 thereto. Each blade 242 includes a radially outer tip 242a which is spaced radially inwardly from the inner surface or shroud of the casing 234 to define therewith a tip clearance T. The tip clearances T are preferably as small as possible to prevent leakage of the gases 232 therethrough which decrease performance of the LPT 222, but must be suitably large to prevent rubbing of the blade tips 242a during differential thermal expansion and contraction between the casing 234 and the blade tips 242a.

The rotor 240 is in the form of a drum rotor having six discrete disks from which the respective rotor blades 242 extend radially outwardly, with the disks being conventionally joined together by bolts or welds. In accordance with the present invention, the turbine rotor 240 is supported by only a single, tubular, support shaft 244 which includes a conical portion or frustrum 246 having an annular first or base end 246a in the form of a radial flange conventionally fixedly joined to the turbine rotor 240 by being bolted thereto for example. The frustrum 246 also includes an annular second or top end 246b, which is opposite to and smaller than the base end 246a, which is removably fixedly joined to the fan shaft 224 by conventional bolts 264 for example. In this exemplary embodiment the frustrum top end 246b is disposed upstream of the frustrum base end 246a and has an inclination or cone angle A relative to the centerline axis 212 of about 50° in this exemplary embodiment.

As illustrated in FIG. 7, the fan shaft 224 is in two conventional portions conventionally splined together near the middle thereof and has a first or forward end 224a conventionally fixedly joined to the fan 214 for rotation therewith, and a second or aft end 224b fixedly joined to the support shaft 244. Torque generated by the rotor blades 242 is transmitted through the support shaft 244 and the fan shaft 224 for rotating the fan 214.

As used herein the several terms forward and aft refer to the relative location in the engine 210 with the forward term referring to the upstream direction and the aft term referring to the downstream direction relative to the flow of the air 228 and combustion gases 232 from the fan 214 downstream through the engine 210 which gases 232 are discharged downstream from the LPT 222.

In the exemplary embodiment illustrated in FIG. 7, a conventional forward or fan frame 248 is disposed between the fan 214 and the compressor 216 and includes a conventional first roller bearing 250 joined to the fan shaft 224 adjacent to the forward end 224a for supporting radial loads therefrom. A conventional stationary rear frame 252 is disposed downstream of the LPT 222 and the turbine rotor 240 thereof, and includes a conical hub 254 extending upstream towards the frustrum 246 and includes a conventional second roller bearing 256 for supporting radial loads transmitted from the LPT 222 through the support shaft 244 to the fan shaft 224.

For example, the combustion gases 232 conventionally expand and lose pressure as they travel through the LPT 222 and, therefore, generate an axial force in the downstream direction as represented schematically by the arrow $F_a$. And, as the engine 210 operates in flight for powering an aircraft, radial loads designated schematically by the arrow labeled $F_r$ act against the LPT 222. The axial component of the axial force $F_a$ is accommodated by a conventional thrust bearing not shown. However, the application of either or both the axial force $F_a$ and the radial force $F_r$ on the LPT 222 relative to the support shaft 244 in the longitudinal plane illustrated in FIG. 7 generates a conventionally known bending moment designated schematically by the double headed circular arrow labeled M. The bending moment M and the radial force $F_r$ are reacted through the forward and aft bearings 250 and 256 by resultant radially directed reaction forces $F_1$ and $F_2$, respectively. However, since the LPT 222 is supported solely by the single support shaft 244, the bending moment M will elastically rotate or deflect the LPT 222 about the support shaft 244 which will, therefore, vary the blade tip clearances T.

More specifically, and referring to FIG. 8, the application of the bending moment M about an axis extending perpendicularly outwardly from the longitudinal plane illustrated will cause elastic deflection between the blade tips 242a and the fan shaft 224 due to the inherent flexibility of the support shaft 244 and the fan shaft 224. In a conventional single support LPT, the support shaft 244 in the form of a frustrum only is directly fixedly joined to the fan shaft 224 in the form of a straight cylinder through either a conventional spline or bolted assembly. The resulting assembly has a conventionally determinable flexibility which will allow the blade tip clearances T to vary both axially from stage to stage as well as circumferentially around the centerline axis 212 in response to the applied bending moment. It should be appreciated that the fan shaft 224 is annular, and the frustrum of a conventional support shaft is conical and, therefore, both are relatively rigid although having a stiffness value which can significantly affect the tip clearances T. Furthermore, they behave in three dimensions so that, for example, the application of the bending moment M caused by a circumferentially local radial force $F_r$ may increase the tip clearance T near the applied radial force $F_r$ while decreasing it at other locations around the circumference of the casing 234 which could lead to undesirable tip rubs as well as loss in aerodynamic performance.

In accordance with one feature of the present invention as illustrated in more particularity in FIG. 8, the fan shaft aft end 224b is configured with the support shaft 244 in a radially extending annular Y- or V-configuration including first and second conical legs 258 and 260, respectively, for increasing the stiffness between the fan shaft 224 and the turbine rotor 240 for more rigidly joining the support shaft 244 to the fan shaft 224 for reducing the tip clearances T due to the applied bending moment M. By more rigidly mounting the turbine rotor 240 through the single support shaft 244 to the fan shaft 224, the tip clearances T may be reduced both in the axial direction from stage-to-stage as well as circumferentially around each stage.

The first and second legs 258 and 260 have respective top or first ends 258a, 260a and bottom or second ends 258b and 260b. The first and second legs 258 and 260 are joined together at the top ends 258a, 260a to define an apex 262 which is disposed radially outwardly of both bottom ends 258b, 260b. The first and second legs 258 and 260 are inclined axially apart from the apex 262 at an included apex angle B therebetween so that the bottom ends 258b and 260b are axially spaced apart at a distance S for increasing the stiffness between the fan shaft 224 and the support shaft 246 for reducing the tip clearances T. In this exemplary embodiment, the apex angle B is about 90°, and may have other suitable values preferably less than 180° and greater than 0° for suitably spreading apart the first and second legs 258 and 260 in the axial direction for increasing the stiffness thereof for reducing the tip clearances T.

In the preferred embodiment, at least the first leg 258 is formed as an integral part of the fan shaft 224 with the first leg bottom end 258b being integral with the fan shaft aft end 224b. As used herein, the term integral means preferably not being selectively removably joined together, for example by splines or bolts, but, on the contrary, being integral as may be obtained preferably by using a common forging, or casting, or being welded together. Integral components, therefore, reduce the number of individual parts which may be assembled or disassembled during a maintenance operation, and, therefore, reduce cost and weight as well as provide for a continuous rigid interconnection between the integral components.

As shown in FIG. 8, the first leg 258 is inclined axially outwardly from the fan shaft 224 relative to the axial centerline axis 212 at a first inclination angle C of about 50°, for example. Although the second leg 260 could be formed integrally with the first leg 258, with the frustrum 246 being bolted to the apex 262, in the preferred embodiment of the present invention, the second leg 260 is an integral part of the support shaft 244 with the top end 260a thereof being integrally joined to the frustrum top end 246b at the apex 262, with the frustrum top end 246b at the apex 262 being conventionally removably fixedly joined to the first leg 258 at its top end 258a by the plurality of circumferentially spaced apart bolts 264. The second leg 260 preferably extends downstream from the frustrum top end 246b and is inclined axially inwardly toward the centerline axis 212 at a diverging angle D measured between the second leg 260 and the frustrum 246. The diverging angle D in this exemplary embodiment is about 90°, although it may have other suitable values less than 180° and greater than 0° for increasing the stiffness between the frustrum 246 and the conical hub 254 through the second leg 260. The second leg 260 is also inclined axially inwardly relative to the centerline axis 212 at a second inclination angle E which in this exemplary embodiment is about 40°.

The support shaft 244 preferably further includes a cylindrical journal shaft 266 fixedly or preferably integrally joined to the second leg 260 as a downstream extension thereof from the second leg bottom end 260b for rotatably supporting the second leg 260 to the turbine frame 252. The second roller bearing 256 rotatably joins the journal shaft 266 to the turbine frame hub 254 for supporting the radial loads transmitted from the turbine rotor 240 through the support shaft 244 to the journal shaft 266 and through the second roller bearing 256 to the conical hub 254 of the turbine frame 252. The second leg 260 is, therefore, preferably rotatably supported to the turbine rear frame 252 so that the turbine rotor 240 is supported by the support shaft 244 and at least the second leg 260, and preferably also by the first leg 258. In this way, the two joining conical first and second legs 258 and 260 provide base-to-base frustrums which collectively provide a relatively high stiffness between the frustrum 246 and the fan shaft 224 and journal shaft 266. With this increased stiffness, the effect of the applied bending moment M and radial loads $F_r$ transmitted from the frustrum 246 forwardly through the first leg 258 and the fan shaft 224 to the first bearing 250 and fan frame 248 (see FIG. 7), and rearwardly through the second leg 260 and the journal shaft 266 to the second bearing 256 and rear frame 252 results in a decrease in relative movement between the blade tips 242a and the casing 234, and therefore, tip clearances T for improving aerodynamic performance of the LPT 222.

The particular dimensions of the first and second legs 258 and 260 including the several angles B, C, E and the axial spacing S, as well as the particular values of the angles A and D, may be conventionally determined for each application for maximizing the increase in stiffness from the legs 258, 260 and support shaft 244 for reducing variations in the tip clearances T due to the application of the bending moment M.

An additional advantage of the present invention is the integral assembly of the frustrum 246, the second leg 260, and the journal shaft 266. Since the journal shaft 266 may be assembled to the second bearing 256 with the turbine rear frame 252, the turbine rotor 240 is, therefore, supported thereby, and the fan shaft 224 may be disassembled from the support shaft 244 without the need for a temporary arbor to support the shaft 244 during a maintenance operation. Furthermore, during initial manufacturing of the LPT 222, a temporary balancing arbor is not required as well since the turbine rotor 240 may again be assembled with the support shaft 244, with the journal shaft 266 being simply mounted to a conventional balancing machine. The elimination of the temporary balancing arbor should improve balance repeatability and accuracy.

Yet further, since the support shaft 244 wraps around the second bearing 256 as shown in FIG. 8 to form a hygienic bearing/sump arrangement, the second bearing 256 is hidden from potential contamination during assembly and disassembly of the LPT 222 with the rest of the engine which increases the reliability of the second bearing 256 and lube system associated therewith.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A turbine support assembly comprising:
    a fan shaft having a forward end and an aft end;
    a turbine rotor having a plurality of stages of rotor blades extending radially outwardly therefrom;
    a support shaft including a frustrum having a base end fixedly joined to said turbine rotor, and a top end removably fixedly joined to said fan shaft aft end; and
    said fan shaft aft end being configured with said support shaft in a radially extending V-configuration including first and second legs having top and bottom ends joined together at said top ends thereof to define an apex, said first and second legs being inclined axially apart at an apex angle therebetween so that said bottom ends thereof are axially spaced apart, at least said first leg forming an integral part of said fan shaft with said first leg bottom end being integral with said fan shaft, and said turbine rotor being supported by said support shaft and said second leg.

2. A turbine support assembly according to claim 1 wherein said second leg is an integral part of said support shaft with said top end thereof being integrally joined to said frustrum top end and inclined axially inwardly therefrom at a diverging angle therebetween, said support shaft further including a cylindrical journal shaft fixedly joined to said second leg bottom end for rotatably supporting said second leg.

3. A turbine support assembly according to claim 2 wherein:
    said frustrum top end is disposed upstream of said frustrum base end; and
    said second leg extends downstream from said frustrum top end.

4. A turbine support assembly according to claim 3 further including:
    a fan fixedly joined to said fan shaft forward end;
    an annular casing having a plurality of stages of stator vanes extending radially inwardly therefrom, and disposed upstream of respective ones of said rotor stages in flow communication therewith; and
    a turbine frame disposed downstream of said turbine rotor, and including a conical hub extending upstream towards said frustrum for rotatably supporting said turbine rotor by said support shaft at said journal shaft.

5. A turbine support assembly according to claim 4 further including:
    a fan frame having a first bearing joined to said fan shaft for supporting radial loads therefrom; and
    said turbine frame having a second bearing joining said journal shaft to said turbine frame for supporting radial loads therefrom.

* * * * *